(12) United States Patent
Jungwirth et al.

(10) Patent No.: US 7,839,503 B2
(45) Date of Patent: Nov. 23, 2010

(54) METHOD AND SYSTEM FOR A SOLAR SIMULATOR

(75) Inventors: Douglas R. Jungwirth, Reseda, CA (US); Gregory A. Campbell, Granada Hills, CA (US)

(73) Assignee: The Boeing Company, Chicago, IL (US)

( * ) Notice: Subject to any disclaimer, the term of this patent is extended or adjusted under 35 U.S.C. 154(b) by 134 days.

(21) Appl. No.: 12/334,971

(22) Filed: Dec. 15, 2008

(65) Prior Publication Data

US 2010/0014080 A1    Jan. 21, 2010

Related U.S. Application Data

(60) Provisional application No. 61/081,311, filed on Jul. 16, 2008.

(51) Int. Cl.
*G01J 3/28* (2006.01)
(52) U.S. Cl. .................................... 356/326
(58) Field of Classification Search ........... None
See application file for complete search history.

(56) References Cited

U.S. PATENT DOCUMENTS

| | | | | |
|---|---|---|---|---|
| 5,217,285 A * | 6/1993 | Sopori | ........................ | 362/1 |
| 6,049,220 A * | 4/2000 | Borden et al. | ................ | 324/765 |
| 6,154,034 A | 11/2000 | Lovelady et al. | | |
| 6,911,349 B2 * | 6/2005 | Li et al. | ........................ | 438/16 |

* cited by examiner

*Primary Examiner*—Tu T Nguyen
(74) *Attorney, Agent, or Firm*—Yee & Associates, P.C.; Sean Casey

(57) ABSTRACT

System and method for testing solar cells is provided. The system includes a first light source configured to generate a first optical beam; a second light source configured to generate a second optical beam; a reflector for each light source, configured to collimate and direct each of the first optical beam and the second optical beam; a spectral filter assembly associated with each of the first light source and the second light source, the spectral filter assembly configured to (a) receive the first optical beam and the second optical beam (b) split each of the first optical beam and the second optical beam into "N" smaller optical beams, and (c) filter the "N" smaller optical beams; a re-imaging assembly for each spectral filter assembly configured to re-image the smaller "N" optical beam at a dichroic mirror that receives one or more N beams.

18 Claims, 7 Drawing Sheets

METHOD AND SYSTEM FOR A SOLAR SIMULATOR

CROSS-REFERENCE TO RELATED APPLICATION

This patent application claims priority to U.S. Provisional Patent Application Ser. No. 61/081,311, filed on Jul. 16, 2008, incorporated herein by reference in its entirety.

TECHNICAL FIELD

The present disclosure relates to solar cells.

BACKGROUND

Solar cells are popular for both space and terrestrial applications. It is desirable to accurately test solar cells based on the solar cell type and its operating environment.

Traditional solar cell testing techniques fail to provide the spectrum and stability for accurate testing of solar cells in various spectral environments that the cells may be used. For example, typical lamps used in standard solar simulators have inherent problems in certain wavelength ranges, in that they have large spikes in their output spectrum that are not matched to the solar spectrum seen in space or on earth. The capability to mask out or eliminate these spikes is desirable to make solar cell testing more reliable and accurate.

Another challenge is to test solar cells based on the environment the cells will be used in. This is especially relevant for terrestrial solar cells where the usage environment, for example, near the equator may be quite different from the environment near the arctic region.

Therefore, a method and system is needed that can accurately duplicate the real-life, spectral distribution that the solar cells may be exposed to.

SUMMARY

In one embodiment, a system for testing solar cells is provided. The system includes a first light source configured to generate a first, optical beam; a second light source configured to generate a second optical beam; and a reflector for each light source, configured to collimate and direct each of the first optical beam and the second optical beam.

The system further includes a spectral filter assembly associated with each of the first light source and the second light source, the spectral filter assembly configured to (a) receive the first optical beam and the second optical beam (b) split each of the first optical beam and the second optical beam into "N" smaller optical beams, and (c) filter the "N" smaller optical beams.

The system also includes a re-imaging assembly for each spectral filter assembly configured to re-image the smaller "N" optical beam at a dichroic mirror that receives one or more N beams as a portion of the first optical beam and as a portion of the second optical beam. The re-imaging assembly adjusts an amount of optical beam that reaches the dichroic mirror. The dichroic mirror is configured to transmit a portion of the first optical beam and the second optical beam and reflect a portion of the first optical beam and second optical beam. Furthermore, the dichroic mirror transmits an optical beam of a wavelength range and reflects an optical beam of another wavelength range.

The system also includes a reflector mirror for reflecting a portion of the first optical beam and the second optical beam as received from the dichroic mirror to the test plane.

In another embodiment, a method for solar cell testing is provided. The method includes: (a) receiving a solar cell information to determine spectral parameters of a test image spectrum; (b) configuring a spectral filter assembly and re-imaging assembly of a solar simulator based on the solar cell information; (c) applying an optical beam generated from a plurality of light sources of the solar simulator on the test plane, wherein the optical beam passes through the spectral filter assembly and a re-imaging assembly to generate a test image spectrum; (d) monitoring a test image spectrum at the test plane to confirm if the generated test image spectrum matches the spectral parameters of the test image spectrum of a solar cell received in step (a); and (e) re-adjusting the spectral filter assembly and re-imaging assembly if the spectral parameters of step (d) do not match with spectral parameters from step (a).

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features of the present disclosure will now be described with reference to the drawings of an illustrated embodiment. In the drawings, the same components have the same reference numerals. The illustrated embodiment is intended to illustrate, but not to limit the disclosure. The drawings include the following Figures.

DETAILED DESCRIPTION

To facilitate an understanding of the various embodiments, the general architecture and operation of a solar simulator system will be described. The specific architecture and operation of the various embodiments of the solar simulator system will then be described with reference to the general architecture.

Solar simulator systems are used for testing solar cells. Solar simulator system (also referred to as solar simulators) emulate sunlight by replicating spectral distribution of natural sunlight.

Typically for testing solar cells, a solar simulator illuminates a test solar cell on a test plane with a light beam within a specific bandwidth range. Since solar cells are designed for a number of different applications, i.e., some cells are designed to operate in space while others are designed for terrestrial use, solar simulators evaluate the performance of each type of cell by using the same solar spectrum in which it is designed to operate. The voltage and current parameters, as well as overall conversion efficiency of the solar cell are monitored and measured.

It is desirable for a solar simulator to accurately replicate the real world environment for a solar cell in a test environment set-up. Furthermore, it is desirable for a solar simulator to have the flexibility to adjust solar spectrum projected on to a test plane. Solar spectrum may be adjusted by selecting the quantity and range of wavelengths (bands) that hit a test plane.

In one embodiment, a solar simulator system for testing solar cells is provided. The solar simulator system Incorporates at least two (2) independent light sources, multiplexed into the same optical beam path, each of which is broken up into many smaller beam paths. Each of these smaller beam, paths are individually filtered spectrally and then re-imaged to overlap at a testing plane at some point in space. Appropriate imaging lenses, optical filters and Irises are put in place to be able to adjust any portion of the spectrum from 100% down to 0% of the input light. This makes the system adjustable within various spectral bands.

Figure 1A:
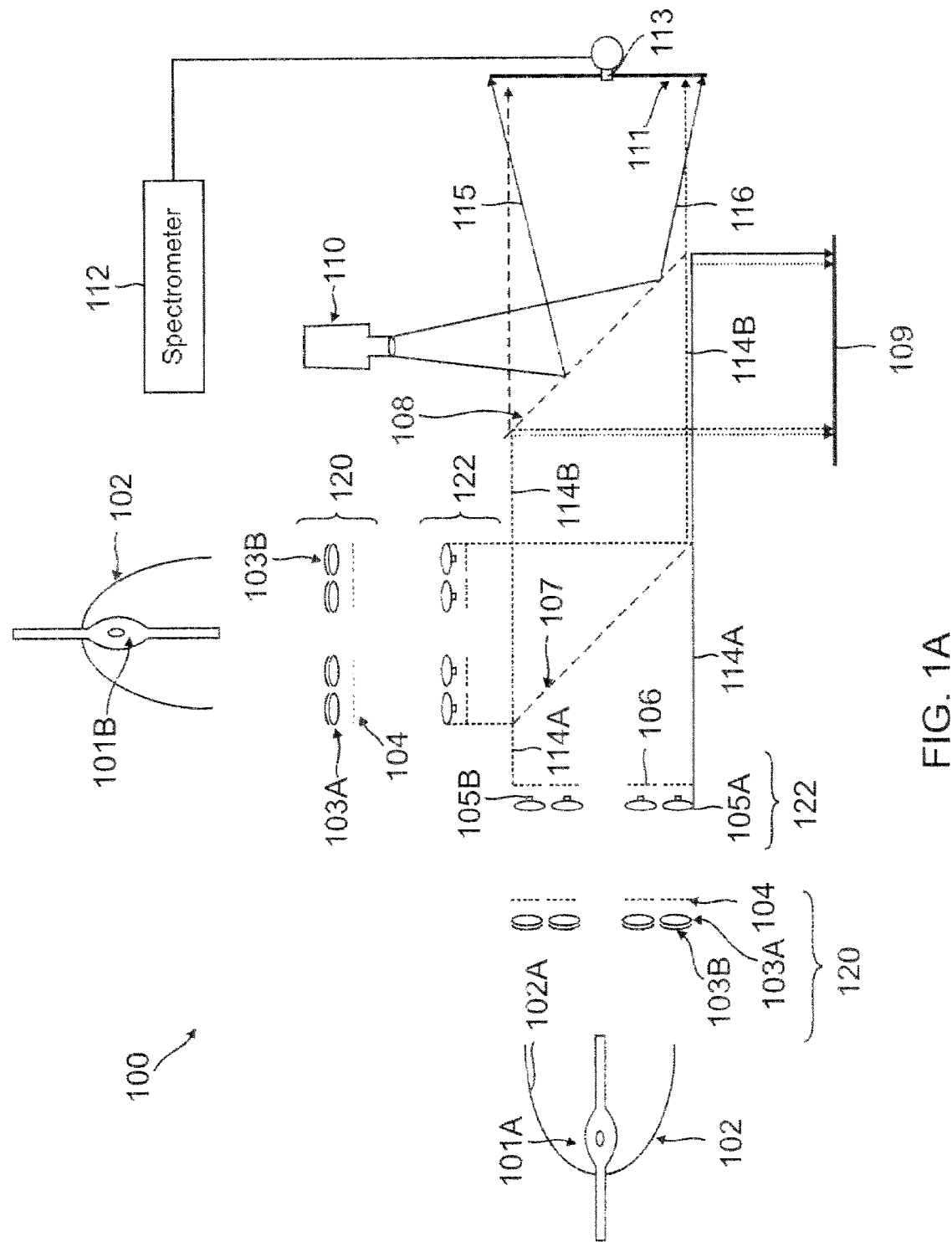
FIG. 1A shows a solar simulator system according to an embodiment of the disclosure.

FIG. 1A illustrates a solar simulator 100 for testing solar cells. The solar simulator 100 may include two independent light sources, lamps 101A and 101B. Lamps 101A and 101B both provide input light for a test plane 109, where a solar cell (not shown) is tested. The lamps (101A and 101B) may be of the same type or different, for example, Xenon, mercury, incandescent, metal vapor or any other type of lamp.

Lamp 101B (and the optics in front of the lamp) is similar in function to the optical elements used with lamp 101A, except the optics with lamp 101B may filter other wavelengths of light than the optics for lamp 101B.

Lamps 101A and 101B generate an optical beam flight) that is reflected from a reflector 102. Reflector 102 includes a reflective internal surface 102A that collects and collimates the light emanating from the source, i.e., lamp (101A or 101B), and redirects the optical beam in the desired direction. The optical beam from lamp 101A is shown as a solid line 114A and the optical beam from lamp 101B is shown as a broken line 114B. First the optical path for optical beam 114A from lamp 101A is discussed with respect to FIG. 1A.

Figure 1B:
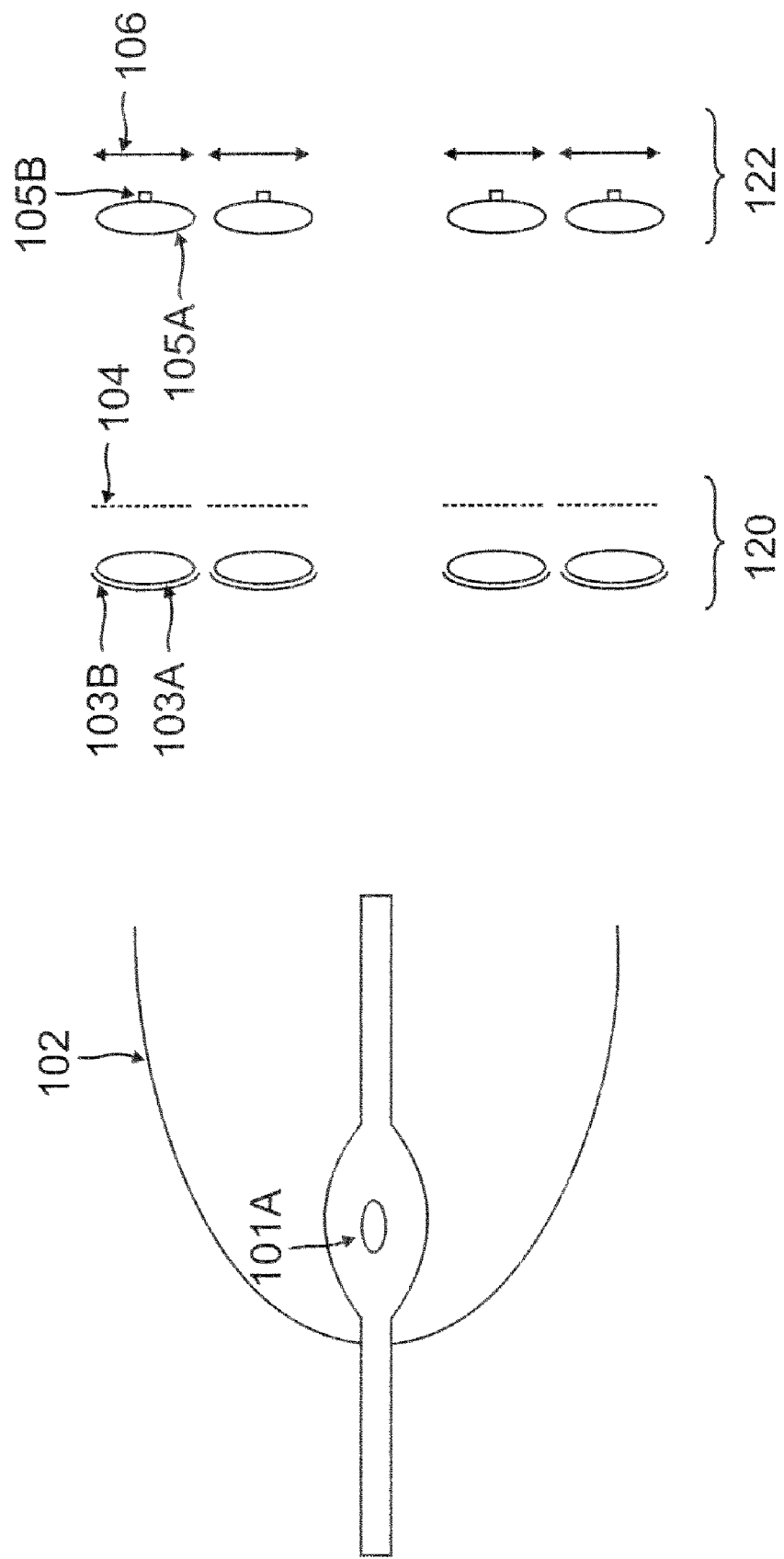
FIG. 1B shows a segment of the solar simulator with optical elements used with a light source, according no one embodiment.

The optical beam (i.e. 114A) passes through a spectral filter assembly (120) that spectrally filters the incident optical beam 114A. Spectral filter assembly 120 (also referred to as filter assembly) comprises a plurality of field lenses (103A) where each field lens has a band-pass coating (103B) associated with it. Filter assembly 120 may also include uniformity masks (104), FIG. 1B shows an example of how filter assembly 120 and 122 are aligned with respect to lamp 101A.

Referring back to FIG. 1A, field lens 103A split the input beam into "N" separate beam packets, one for each field lens. Field lens 103A also modifies the divergence of the individual beams to fully fill the next lens(es) in the simulator system 100. The shape of field lenses 103A determines the shape of the final illuminated beam footprint. In one embodiment, field lenses 103A are lenses in a hex pattern of either round, square, rectangular or hexagon shaped elements.

Each field lens 103A includes a band-pass coating 103B that acts as a band pass filter allowing transmission of only selected wavelength (band) of light. The fact that each of the individual beam paths have only one "band" (or wavelength) of light allows the user to vary the intensity of a specific individual beam to increase or decrease the portion of the light spectrum that hits the test plane.

Band-pass coatings 103B may be provided on one or more surfaces of the field lens 103A. In one embodiment, field lens 103A and band-pass coatings 103B are chosen in matched pairs to maintain a spectral balance across the illuminated test plane area (explained below with respect to FIG. 1F).

The optical beam exiting from field lens 103A may also pass through a uniformity mask (also referred to as "Masks" or "Mask" 104) 104. Masks 104 are positioned upstream from field lenses 103A in the simulator system 100. Masks 104 are used to balance brightness level. Masks 104 are spatially varying transmission elements and are designed to compensate for the natural intensity variations across the area of the optical beam. The spatial resolution of mask 104 is higher than the spatial resolution of the test plane 109 (i.e., solar cell). In one embodiment, each field lens 103A is provided with its own uniformity mask 104. In one embodiment, mask 104 may be made of glass with a reflective aluminum coating.

After the spatially balanced beam passes through masks 104, the beams hit a re-imaging assembly 122 placed upstream from the filter assembly 120. According to one embodiment, the re-imaging assembly 122 includes a plurality of projection lenses 105A, each projection lens having an obscuring dot 105B and an associated Iris mechanism 106.

Projection lenses 105A re-image the optical beam coming through field lenses 103A to the test plane 109. Projection lenses 105A are positioned laterally such that all the individual images overlap at test plane 109.

Iris mechanism (also referred to as Iris or Irises) 106 controls the magnitude of light coming from projection lens 105A. As an Iris 106 opens and closes, it increases or decreases the amount of light that is allowed to proceed through that optical beam path. By controlling the level to which an Iris mechanism 106 opens (or closes), one can adjust the spectral bandwidth hitting a test plane.

Figure 1C:
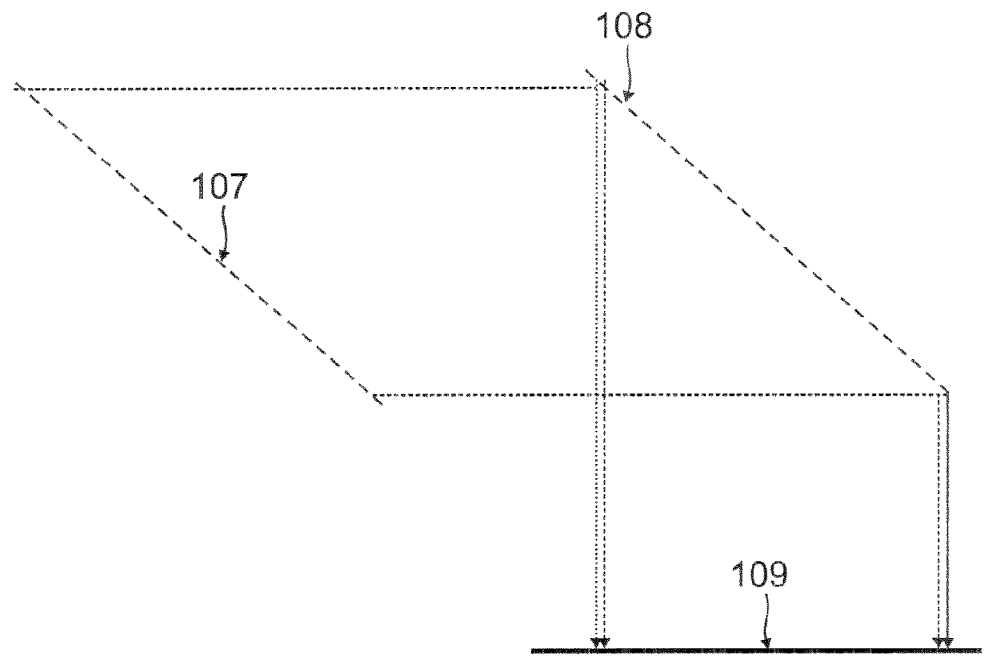
FIG. 1C shows a segment of the solar simulator with a dichroic mirror, a reflector and a test plane of the solar simulator system, according to one embodiment.
Figure 1D:
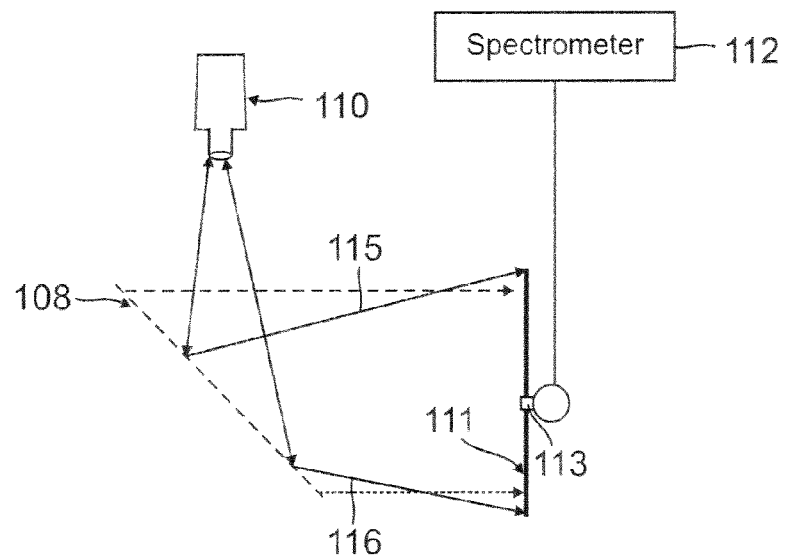
FIG. 1D shows a segment of the solar simulator system with a diagnostic plane as it relates to a reflector of the solar simulator system, according to one embodiment.
Figure 1E:
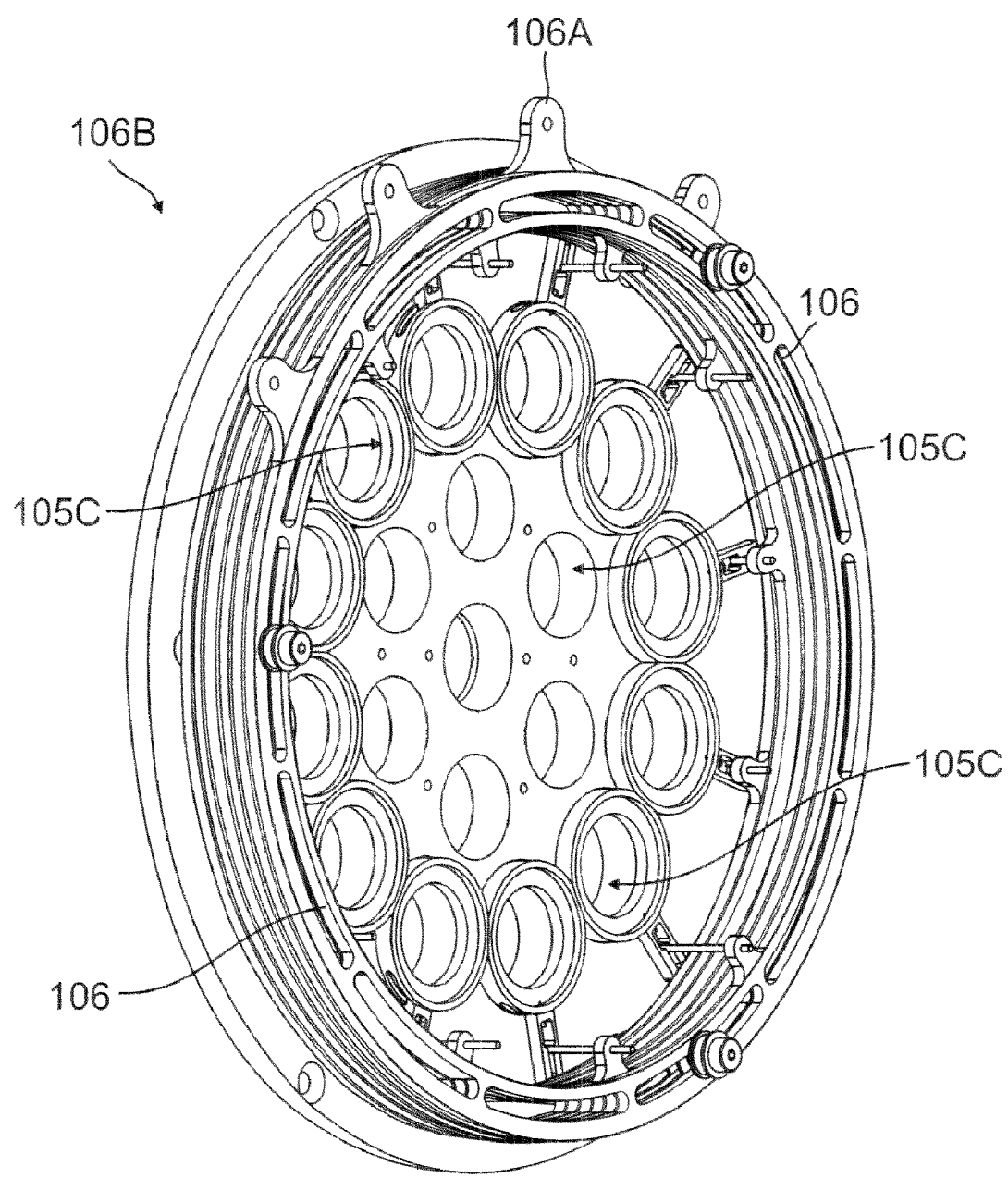
FIG. 1E shows a segment of the solar simulator system having matched pairs of Irises, according to one embodiment.

Irises 106 may be used in matched pairs symmetric across the center of the optical configuration (explained below in detail with respect to FIGS. 1E and 1F). In one embodiment, Irises 106 are motorized to provide an automatic adjustment of the spectral content of the light hitting the test plane 109.

Typically, Irises 106 cannot close completely due no their construction. Obscuring dot (also referred to as "reflecting dot" or "Dot") 105B is placed on the center of each projection lens 105A. Reflecting dot 105B is a miniscule coating of a reflective material on a projection lens 105A that allows 0% transmission to the test plane 109.

The reflective material used for obscuring dot 105B may be aluminum or any other material that blocks transmission of light. The size of obscuring dot 105B depends on the type and structure of Iris 106. In one embodiment, obscuring dot 105B is only slightly bigger in diameter then the smallest diameter of Iris 106 in the closed position. Iris mechanism 106 when used with obscuring dot 105B allows adjusting the spectral assembly transmission from 0% to 100%.

Figure 1F:
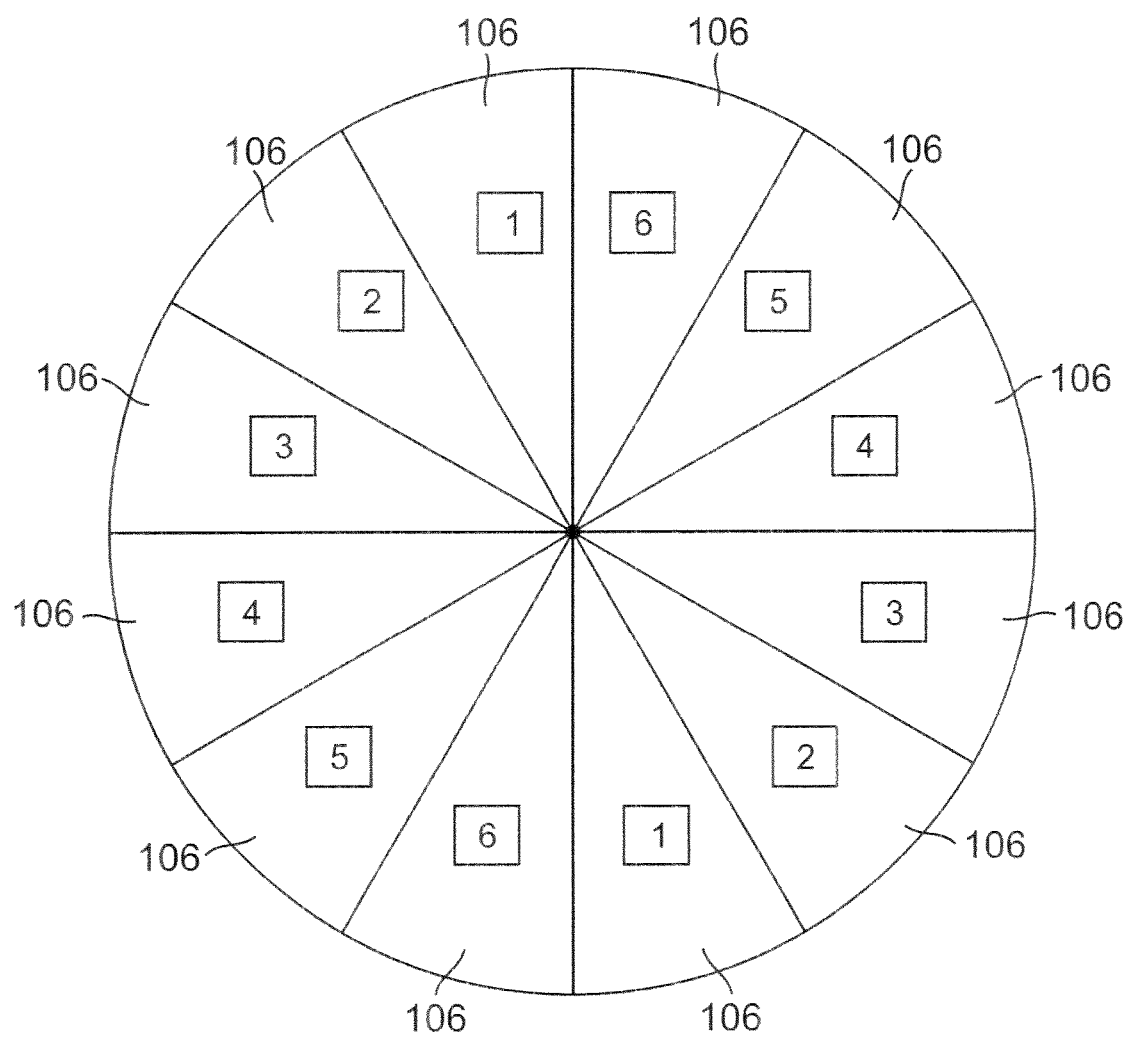
FIG. 1F is a schematic diagram of matched pairs of Iris in a re-Imaging assembly.
Figure 1G:
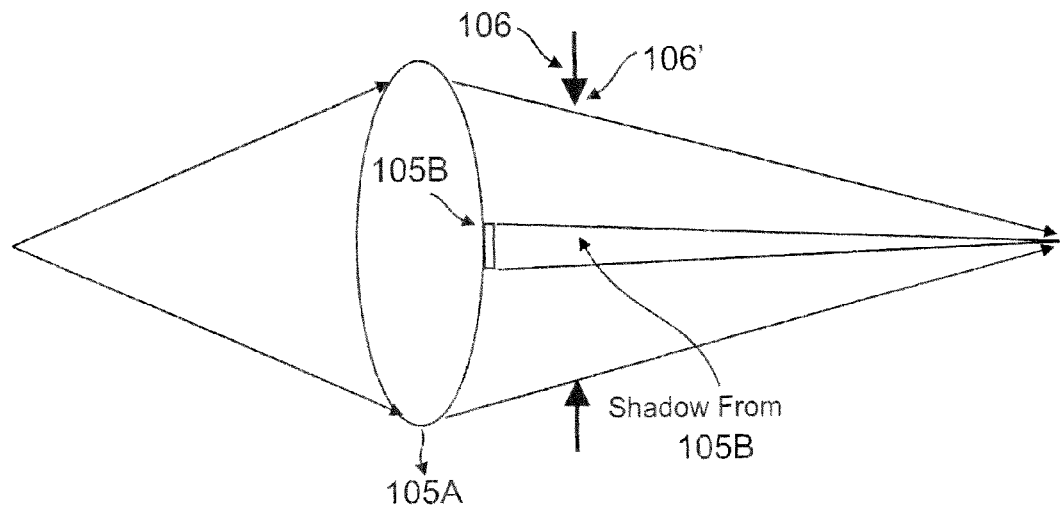
FIGS. 1G and 1H show formation of an image on a test plane where an Iris mechanism has wide and narrow openings, respectively.
Figure 1H:
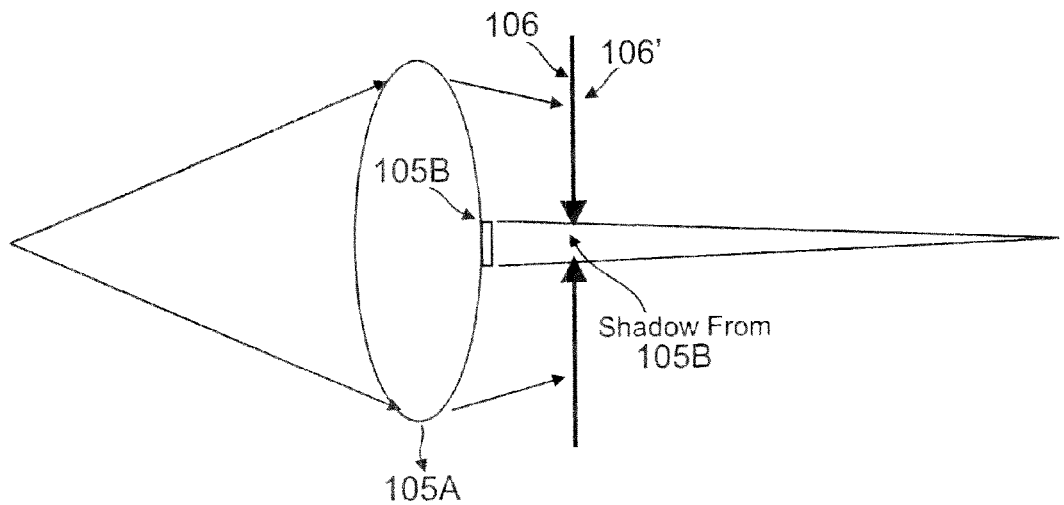

FIG. 1G illustrates 100% transmission through re-imaging assembly 122 when Iris 106 is in open position (shown as 106'). FIG. 1H illustrates 0% transmission through re-imaging assembly 122 with Iris 106 at its closed position (shown as 106") and obscuring dot 105B ensuring that there is no transmission. Re-imaging assembly 122 allows 0% to 100% adjustment of any wavelength band of spectrum reaching the test plane 109.

The optical beam from re-Imaging assembly 122 passes via a dichroic mirror 107 positioned upstream to the re-imaging assembly 122. Dichroic mirror 107 (shown in detail in FIG. 1C), allows transmission of optical beam of certain wavelength and reflects other wavelengths. Dichroic mirror 107 may be designed to transmit light from lamp 101A that is transmitted through any of field lenses 103A (with their band-pass filters 103B) and to reflect a similar light beam received from lamp 101B. Dichroic mirror 107 is aligned to overlap transmitted beam from lamp 101A with a reflected beam from lamp 101B on test plane 109.

In one embodiment, dichroic mirror 107 when used with lamp 101A allows visible light to pass through and reflect the infra-red rays. When used with lamp 101B, dichroic mirror 107 reflects the infra-red light onto test plane 109 and allows the visible light to pass through.

In one embodiment, the optical beam from dichroic mirror 107 passes to a reflector mirror 108. Reflector mirror 108 reflects the majority of the beam (for example, 99%) to travel to test plane 109 while the remaining portion (for example 1%) is transmitted to a diagnostic plane 111. The reflected beam is projected to the test plane 109 for testing, while the transmitted beam (to the diagnostic plane 111) is used for diagnostics of the overall simulator system 100. At the test plane 109, the solar cell is tested and its results monitored.

In one embodiment, diagnostic plane 111 is a point in space equidistant from the lamps (101A and 101B) as the test plane 109. The diagnostic plane 111 has a flat plate (normal to incoming light) that is covered with a uniform, "white", scattering material which scatters the incoming light in a Lambertian distribution scatter (i.e. Spectroflect).

In one embodiment, a monitoring system may be used at the diagnostic plane 111 to monitor the optical content on the diagnostic plane 111. The monitoring system may include an integrating sphere 113 and/or a uniformity camera 110 for tracking and analyzing the optical content at diagnostic plane 111.

In one embodiment, the simulator system 100 uses Integrating sphere 113 to assist in measuring the spectral content of light applied to test plane 109. The light from integrating sphere 113 may be sent to a spectrometer 112 and the total spectrum of the illuminating light may be measured and recorded. This spectrum may be used to modify the spectrum of light at test plane 109 to a desirable value. Irises 106 may be adjusted to change the light that is applied to test plane 109. This allows one to adjust the optical beam based on the solar cell operating environment.

In another embodiment, a uniformity camera 110 may be used to view the diagnostic plane 111. This is shown in detail in FIG. 1D. Light from diagnostic plane 111 goes back in the original direction, reflected by reflector 108 (shown as 115 and 116, FIG. 1D) and is imaged by camera 110. The image from camera 110 provides an accurate map of the intensity distribution seen at the test plane 109. The integrated value from camera 110 provides a power measurement for light hitting test plane 109.

In one embodiment, the specific design of field lenses (103A) and the projection lenses (105A) is determined in conjunction with all the other optical elements of the simulator to provide a smooth, uniform illumination at the test plane 109.

In one embodiment, Irises 106, field lenses 103A, projection lenses 105A are used in matched pairs symmetric across the center of the optical configuration. FIG. 1E shows an assembly 106B with a plurality of holes 105C that are configured to receive matched pair of field lenses 105A (with dot 105B) in a hexagonal pattern, either round, square, rectangular or hexagon shaped elements. Irises 106 may be adjusted mechanically using mechanism 106A or via motorized means (not shown).

FIG. 1F shows placement of matched pairs of Irises 106. The matched pairs are indicated by the matching numbers on Irises. In the Illustrated embodiment, twelve Irises (six pairs) are shown. However, those of ordinary skill in the art will appreciate that re-imaging assembly could include any number of Irises 106. Each matched pair of Irises 106 block a desired quantity of light within a given wavelength. This balances out some of the non-uniformity that occurs when beams hit the test plane 109 at a non-normal incidence angle. Re-imaging assembly 122 thus produces a symmetrical and balanced output beam.

Field lens 103A with band-pass filters 106B, and projection lens 105A with obscuring dot 105B may similarly be arranged in matched pairs placed diametrically opposite to each other. The spectral content of the light within one portion of the beam's cross section is closely matched with the spectral content of the light within the diametrically opposed portion of the beams cross-section.

In one embodiment, system 100 provides the capability for a light spectrum of one or two lamps to be broken up into as many as 18 different band widths, and, with the help of an Iris 106 and a small obscuring dot 105B on the projection lens 105A, each of those bands can be independently adjusted from 0% to 100% of the available light from the appropriate lamp. Each of these 18 bands are projected to test plane 109 in 2 "matched" beams whose angle of incidence is symmetric about the normal of the test plane 109 and at an angle close enough to the normal to maintain very good spatial uniformity. It also provides a technique to improve the uniformity of each of the individual beams to almost any level that is desired.

The movement of Irises 106 may be motorized and along with the monitoring system (spectrometers 112 or other sensors) this maybe computer controlled to provide a continuous spectral match to virtually any spectrum, either static in time or variable in time.

Figure 2:
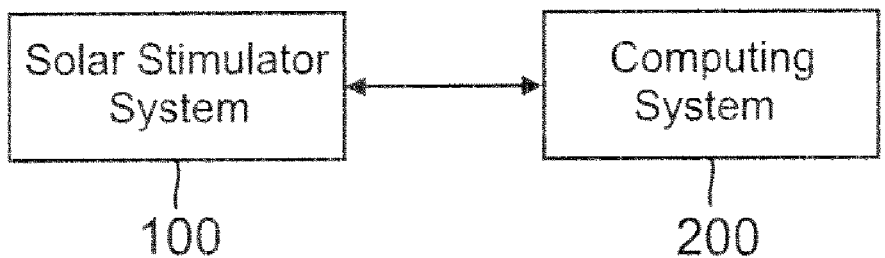
FIG. 2 illustrates an example of a use of a solar simulator system with an integrated computing system, according to one embodiment.
Figure 3:
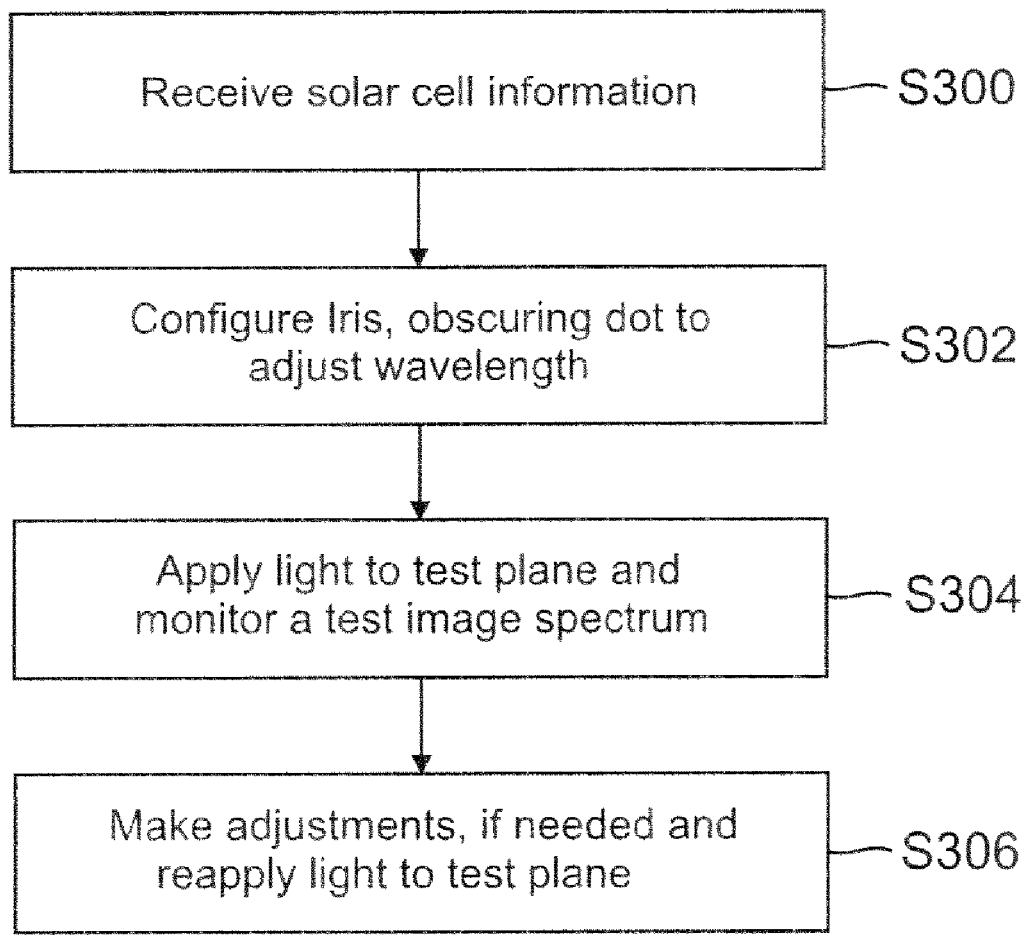
FIG. 3 shows process steps for using a solar simulator system having an integrated computing system, according to one embodiment.

FIG. 2 shows an example of system 100 that is integrated with computing system 200 for automatically making adjustments. The various process steps associated with both the systems 100 and 200 are described below with respect: to the flow diagram of FIG. 3.

The process starts in step S300, when one collects the solar cell information, including where and now the solar cell will be used. A user interface (not shown) using computing system 200 provides the solar cell information to solar simulator 100.

In step S302, Iris 106, obscuring dot 105B, and band-pass filters 105B are applied and/or adjusted. In step S304, after light is applied to test plane 109, the applied spectrum is monitored at a test plane 109. The applied spectrum may also be monitored at diagnostic plane 111 as explained above with respect to FIGS. 1A-1D.

In step S306, if the spectrum is not acceptable, then adjustments are made to reapply light to the test plane 109. The process continues until an acceptable result is achieved.

System 100 has various advantages, for example; a dual lamp system can utilize two different kinds of lamps which may allow for certain regions of one lamp (the region with optical spikes) to be discarded and the other lamp supply the light for that portion of the spectrum.

Field lens/projection lens (103A and 105A) pairs split up and re-image the different portions of the two lamps to overlap at test plane 109. This provides for enhanced spatial uniformity and jitter reduction. Also, since the lenses work in matched, balanced pairs it minimizes non-uniformities that might occur from a non-zero angle of incidence.

Spectral band-pass filters 103B, again in matched, balanced pairs, allow only certain wavelengths of light to be transmitted on each individual beam path. Increasing and decreasing the effective throughput for each of these individual beam paths allow the system to adjust the spectrum to any value desired Spectral balancing is done with the use of Iris 106 after each projection lens 105A. Obscuring dot 105B placed at the center of the projection lens 105A allows Iris 106 to completely cut out any wavelength band from proceeding through that particular beam path of the system 100. This allows 0% to 100% adjustment of any wavelength band of the spectrum. Computer control, of Irises, along with feedback from the spectrometers 112 or other wavelength sensors, allow real time control of the light spectrum that is being sent to test plane 109. Up to 18 different, match pairs of Irises may be used in this system. This allows the spectrum to be split up into 18 different small wavelength bands that may be adjusted separately and continuously.

Reflector 108 allows a test beam to be aligned to the test plane 109, but also allows a small diagnostic beam to be picked off and tested at the same time. The reflector 108 allows for "on axis" viewing of the test beam by both the uniformity camera 110 and the integrating sphere 113.

The diagnostic plane 111 allows for an accurate sampling of the spectral and spatial profile at the test plane 109, without interfering with the tests that are performed.

Although the present disclosure has been described with reference to specific embodiments, these embodiments are illustrative only and not limiting. Many other applications and embodiments of the present disclosure will be apparent in light of this disclosure and the following claims.

What is claimed is:

1. A system for testing solar cells, comprising:
   a first light source configured to generate a first optical beam;
   a second light source configured to generate a second optical beam;
   a reflector for each light source, configured to collimate and direct each of the first optical beam and the second optical beam;
   a spectral filter assembly associated with each of the first light source and the second light source, the spectral filter assembly configured to (a) receive the first optical beam and the second optical beam (b) split each of the first optical beam and the second optical beam into "N" smaller optical beams, and (c) filter the "N" smaller optical beams;
   a re-imaging assembly for each spectral filter assembly configured to re-Image the smaller "N" optical beam at a dichroic mirror that receives one or more N beams as a portion of the first optical beam and as a portion of the second optical beam;
   wherein the re-imaging assembly adjusts an amount of optical beam that reaches the dichroic mirror;
   wherein the dichroic mirror is configured to transmit a portion of the first optical beam and the second optical beam and reflect a portion of the first optical beam and second optical beam;
   wherein the dichroic mirror transmits an optical beam of a wavelength and reflects an optical beam of another wavelength; and
   a reflector mirror for reflecting a portion of the first optical beam and the second optical beam as received from the dichroic mirror to a test plane.

2. The system of claim 1, wherein the spectral filter assembly comprises a plurality of field lenses and a plurality of band-pass filters used in matched pairs, and the band-pass filters allow selected wavelength of an optical beam to pass through the field lens.

3. The system of claim 2, wherein the spectral filter assembly further comprises a uniformity mask for each field lens for controlling a brightness level of the portion of optical beams applied to the test plane.

4. The system of claim 1, wherein the re-imaging assembly comprises: (a) a plurality of projection lenses, each projection lens having an obscuring dot placed thereon, and (b) an Iris mechanism for each projection lens to control an amount of each of the optical beam that reaches the test plane.

5. The system of claim 4, wherein the obscuring dot is sized to be larger than a minimum opening of the Iris mechanism.

6. The system of claim 4, wherein the projection lens with the obscuring dots and Iris mechanisms are used in matched pairs in the re-imaging assembly.

7. The system of claim 1, further comprising a diagnostic plane configured to receive a portion of the optical beams reflected by the reflector mirror.

8. The system of claim 7, further comprising a monitoring system configured to monitor and analyze the optical beams received at the diagnostic plane.

9. The system of claim 8, wherein the monitoring system includes a camera configured to provide images of a spectral distribution of an optical beam applied to the test plane.

10. The system of claim 8, wherein the monitoring system includes an integrating sphere configured to quantify a spectral content of the optical beam applied to the test plane.

11. A system for testing solar cells, comprising:
    a first light source configured to generate a first optical beam;
    a second light source configured to generate a second optical beam;
    a reflector for each light source, configured to collimate and direct the first optical beam, and the second optical beam;
    a spectral filter assembly associated with each of the first light source and the second light source, the spectral filter assembly configured to (a) receive the first optical beam and the second optical beam (b) split each of the first optical beam and the second optical beam into "N" smaller optical beams, and (c) filter the "N" smaller optical beams;
    a re-imaging assembly for each spectral filter assembly configured to re-image the smaller "N" optical beam at a dichroic mirror that receives one or more N beams as a portion of the first optical beam and as a portion of the second optical beam;
    wherein the re-imaging assembly adjusts an amount of optical beam that reaches the dichroic mirror;
    wherein the dichroic mirror is configured to transmit a portion of the first optical beam and the second optical beam and reflect a portion of the first optical beam and second optical beam;
    wherein the dichroic mirror transmits an optical beam of a wavelength and reflects an optical beam of another wavelength; and
    a reflector mirror for reflecting a first portion of the optical beams received from the dichroic mirror to a test plane, and transmitting a second portion of the optical beams to a diagnostic plane; wherein the first portion is larger than the second portion; and
    a monitoring system configured to monitor and analyze the optical beam received at the diagnostic plane.

12. The system of claim 11, wherein the spectral filter assembly comprises a plurality of field lenses and a plurality of band-pass filters used in matched pairs, and the band-pass filters allow selected wavelength of an optical beam to pass through the field lens.

13. The system of claim 12, wherein the spectral filter assembly further comprises a uniformity mask for each field lens for controlling a brightness level of the portion of optical beams applied to the test plane.

14. The system of claim 11, wherein the re-imaging assembly comprises: (a) a plurality of projection lenses, each projection lens having an obscuring dot placed thereon, and (b) an Iris mechanism for each projection lens to control an amount of each of the optical beam that reaches the test plane.

15. The system of claim 14, wherein the obscuring dot is sized to be larger than a minimum opening of the Iris mechanism.

16. The system of claim 14, wherein the projection lens with the obscuring dots and Iris mechanisms are used in matched pairs in the re-imaging assembly.

17. The system of claim 11, wherein the monitoring system includes a camera configured to provide images of a spectral distribution of an optical beam applied to the test plane.

18. The system of claim 11, wherein the monitoring system includes an integrating sphere configured to quantify a spectral content of the optical beam applied to the test plane.

\* \* \* \* \*